United States Patent
Preymann

(10) Patent No.: US 6,624,603 B2
(45) Date of Patent: Sep. 23, 2003

(54) METHOD AND DEVICE FOR DETERMINING THE ACTUAL REVERSAL OF A FOLLOW-ON ROTARY DRIVE

(75) Inventor: Leonard Preymann, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/985,593

(22) Filed: Nov. 5, 2001

(65) Prior Publication Data

US 2002/0057084 A1 May 16, 2002

Related U.S. Application Data

(63) Continuation of application No. PCT/EP00/03632, filed on Apr. 20, 2000.

(30) Foreign Application Priority Data

May 5, 1999 (DE) .......................... 991 08 921

(51) Int. Cl.[7] .............. H02P 1/22; H02P 1/40

(52) U.S. Cl. ............ 318/281; 318/138; 318/280; 318/282; 318/283; 318/254; 318/466

(58) Field of Search ............ 318/138, 280, 318/281, 282, 283, 254, 466

(56) References Cited

U.S. PATENT DOCUMENTS

| | | | | |
|---|---|---|---|---|
| 4,258,299 A | * | 3/1981 | Takeda et al. | 318/258 |
| 5,039,925 A | * | 8/1991 | Schap | 318/282 |
| 5,689,160 A | * | 11/1997 | Shigematsu et al. | 318/281 |
| 5,764,008 A | * | 6/1998 | Hahn et al. | 318/256 |
| 5,801,501 A | * | 9/1998 | Redelberger | 318/283 |
| 6,081,088 A | * | 6/2000 | Ishihara et al. | 318/466 |

FOREIGN PATENT DOCUMENTS

| | | | |
|---|---|---|---|
| DE | 43 16 898 C2 | 12/1993 | E05F/15/20 |
| DE | 42 33 549 A1 | 4/1994 | G01P/3/481 |
| EP | 0 469 318 A1 | 2/1992 | B23B/31/00 |

* cited by examiner

Primary Examiner—Robert E. Nappi
Assistant Examiner—Tyrone Smith
(74) Attorney, Agent, or Firm—Sughrue Mion, PLLC

(57) ABSTRACT

A method and a device for incrementally determining the actual reversal of a rotary drive that rotates on slightly even after a preceding signal switching the rotational direction is applied. A sequence of pulse signals (N; S; $S_L$) that are proportional to the rotational speed, with an intermittent reference signal ($S_L$) that is different from said pulse signals, is output by an asymmetric transmitter wheel (1) and received by a single sensor (3) located on the stator. A pulse signal correction value for determining the pulse signal count value corresponding to the actual reversal (U) of the rotary drive is defined, based on the number of pulse signals that are measured between two reference signals following a switch of direction.

12 Claims, 1 Drawing Sheet

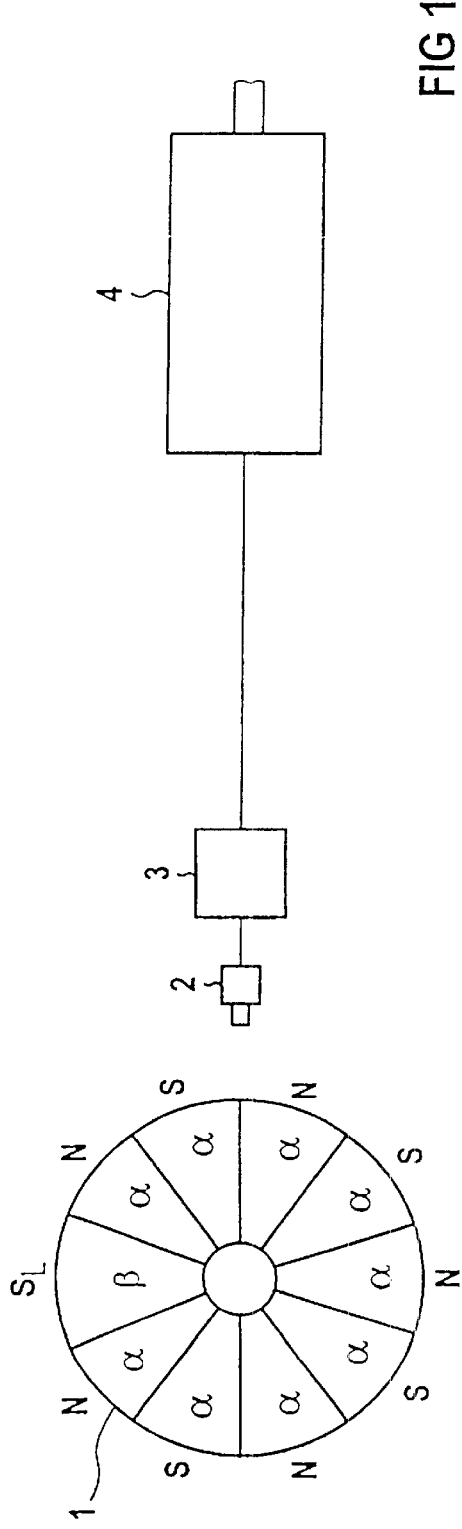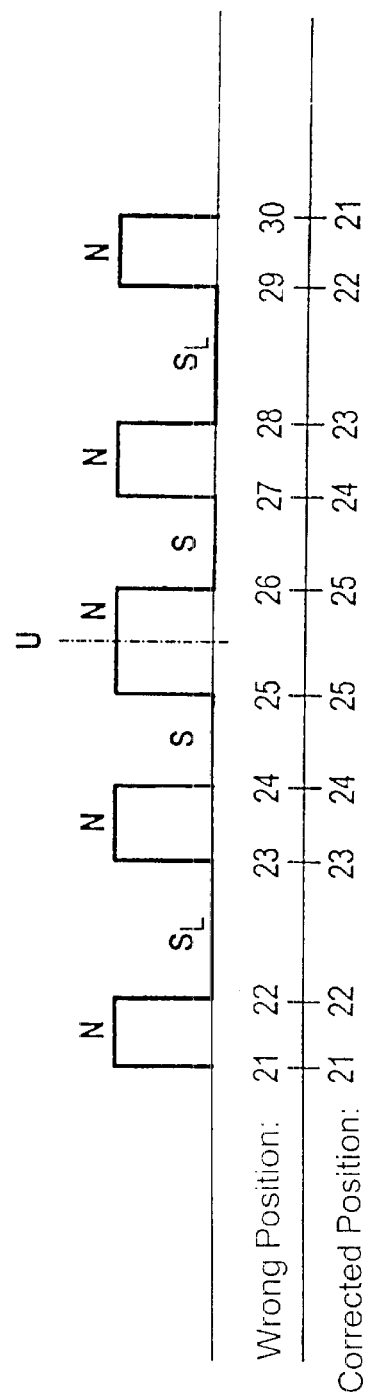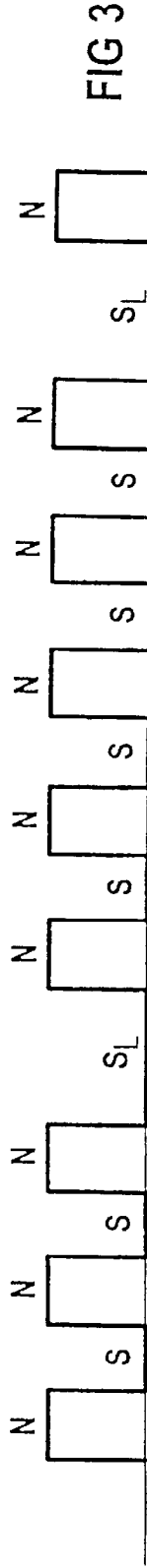

METHOD AND DEVICE FOR DETERMINING THE ACTUAL REVERSAL OF A FOLLOW-ON ROTARY DRIVE

This is a Continuation of International Application PCT/EP00/03632, with an international filing date of Apr. 20, 2000, which was published under PCT Article 21(2) in German, and the complete disclosure of which, including amendments, is incorporated into this application by reference.

FIELD OF AND BACKGROUND OF THE INVENTION

The invention relates to a method and to a device for incrementally determining the actual reversal of a rotary drive that follows on after a preceding signal switching the rotational direction.

Methods and devices of the above-mentioned type are required e.g. in actuators as information for ascertaining the position of a moving part moved by the actuator. Preferred examples of such moving parts, in practical applications, include motorized window lifters and sunroof drives in motor vehicles, in particular those equipped with a quick-reaction closing power restriction capability. Such a capability is provided in motor vehicles to prevent persons' arms and such from being pinned by the moving part and are therefore subjected to increasingly rigorous safety standards.

In order to determine the respective opening or closing position and direction of rotation of a motor vehicle closing part driven by a rotary drive, the device ordinarily includes an incremental transmitter system having a rotary-side transmitter wheel and a sensor on the stator-side that detects the signals of the rotating transmitter wheel. Such a device is known, e.g., from German Laid-Open Publication DE 42 33 549 A1, which discloses fashioning the rotary-side transmitter wheel of the incremental transmitter system as an asymmetrical magnet wheel e.g. on the drive of an armature of the electrical motor driven by the actuator. The sensor on the stator side is preferably a Hall sensor detecting the signals of the rotating transmitter wheel. Changes in cogs or polarity cause the rotating transmitter wheel to generate (if necessary after some signal processing) a basically rectangular pulse signal having flanks defined by high and low signals, respectively. This rectangular pulse signal can also be coded for determining the rotation direction of the transmitter wheel.

When the device detects a restriction of movement of the closing part, the motor of the actuator causes the closing part to reverse direction by changing the polarity of the supply voltage of the actuator, for instance in the manner disclosed in German Laid-Open Publication DE 43 16 898 C2. Due to electrically inductive and/or mechanical inertia, the actual mechanical reversal in direction of rotation takes place with a certain time lag in relation to the switch in the signal itself which causes the change in direction of rotation by changing the polarity of the supply voltage. The timing and the position of the actual rotation reversal is therefore not identical to the timing of the voltage reversal. If no second stator-side sensor is provided and circumferentially offset in relation to the first stator-side sensor, the timing and position of the actual rotation reversal cannot be determined from a phase comparison of the detected flank signals of the two sensors.

OBJECTS OF THE INVENTION

According to one object of the present invention, the actual mechanical reversal of the rotation direction of a rotary drive, following a switching signal electrically switching the rotation direction should be detectable and assignable to the corresponding correct pulse signal value count of the respective position of the moving part being moved by the rotary drive. The determination of the actual reversal of the rotary drive allows the pulse signal value count to be properly correlated with a pulse count value reference template defining the entire range of motion of the moving part, e.g. from a fully open position to a fully closed position. This, in turn, ensures that reversals of the rotation direction do not give rise to errors in the correlation, which could otherwise, e.g., lead to undesirable differences between, e.g., the calculated fully closed position and the actual fully closed position of the moving part. A further object of the invention is to reduce the design and production costs for devices that determine the actual reversal of the rotary drive. In particular, it is an object to provide such a device that utilizes only a single stator-side sensor.

SUMMARY OF THE INVENTION

According to one formulation of the invention, these and other objects are solved by a method for incremental determination of an actual reversal of a rotary drive that follows on after a preceding signaled switch in rotary direction, which includes: (i) defining the rotation of the rotary drive with a sequence of pulse signals that are proportional to the rotational speed of the rotary drive, with an intermittent reference signal that differs from the pulse signals; (ii) counting the pulse signals on a stator side; and (iii) determining the actual reversal of the rotary drive after the signaled switch in rotational direction by utilizing a pulse signal correction value, and by utilizing a change from a monotonous increase to a monotonous decrease of pulse signal lengths of the pulse signals. The pulse signal correction value is derived from counting the pulse signals between respective occurrences of the reference signal before and after the actual reversal of the rotary drive.

According to another formulation of the invention, there is provided a device for determining an actual reversal of a rotary drive that follows on after a preceding signaled switch in rotary direction, which includes: (i) an asymmetrical rotor-side transmitter producing a sequence of pulse signals that are proportional to the rotational speed of the rotary drive, and an intermittent reference signal that differs from the pulse signals; (ii) one single stator-side sensor receiving the signals from the rotor-side transmitter wheel and outputting a stator-side signal count value; and (iii) an evaluating device forming a pulse signal correction value derived from a count of the signals between respective occurrences of the reference signal before and after the actual reversal of the rotary drive and adjusting the stator-side signal count value, based on the pulse signal correction value, to reflect the actual reversal of the rotary drive.

On the basis of the method in accordance with the present invention, the number of poles, or the number of pulse signals, between two reference signals rotating past the single stator-side sensor, one after the other, is counted. Herein, the first reference signal is associated with the initial rotation direction and the following reference signal is associated with the subsequent, opposite direction of rotation, since the actual reversal in the direction of rotation of the rotary drive lies intermediate between the two reference signals. In order to obtain the correct actual total pulse signal pulse count value, it is necessary to subtract the number of pulse signals counted within this time frame from the otherwise incorrect total pulse signal count value. This incorrect total pulse signal count value requires adjustment, in particular, because it includes additional pulse signals generated, due to induction, through the second reference signal. However, by subtracting the above-noted pulse signal correction value, one obtains the correct actual added-together total pulse signal count value corresponding to the actual current position of the moving part moved by the rotary drive. As noted above, the moving part is preferably a motor vehicle window or a motor vehicle sunroof.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

FIG. 1 shows a diagram of the construction of a device for the incremental determination of the actual reversal of a rotary drive using a 10-pole asymmetric magnet wheel as a rotary-side transmitting wheel, as well as a stator-side sensor in the form of a Hall element;

FIG. 2 shows the pole sequence and the associated pulse signal sequence between two reference signals including an intermediate switch in direction of the transmitting wheel, as well as the associated uncorrected and corrected pole count of the respective total pulse signal count value; and FIG. 3 shows the pole sequence and the pulse signal sequence of the asymmetrical transmitting wheel in accordance with FIG. 1, in which the direction remains constant.

DETAILED DESCRIPTION OF THE PREFERRED EMBODIMENTS

FIG. 1 shows an incremental transmitting system with a transmitting wheel 1 in the form of a segmented magnetized magnet wheel with five pole pairs, i.e. ten poles, and a stator-side sensor 2 in the form of a Hall element. The pulses detected by the Hall element are processed into pulse signals in a signal device 3 and are evaluated in a control device used jointly as an evaluating device 4 and for controlling a window lifter or a sunroof drive in a motor vehicle. The pulse signals, in turn, are processed to provide a correction adjustment, as described in greater detail below.

The asymmetric transmitter wheel 1 has nine poles N; S with pole width alpha ($\alpha$) and one pole $S_L$ with an enlarged pole width beta ($\beta$), which is provided as a reference signal for determining the actual mechanical reversal of direction in accordance with the present invention. When configuring the pole widths of alpha and beta it is important that even in the most unfavorable case of a production-related pole-width fluctuation, the pole width beta of the pole $S_L$, designed as the reference signal transmitter, is significantly distinguishable from the other pole widths alpha. The pole widths alpha are uniform to each other. In operation, the poles N; S; $S_L$ rotate with the transmitting wheel 1 past the sensor 2. After being processed in the signal device 3, the rotating poles N; S; $S_L$ yield—as shown in FIG. 3—basically rectangular pulse signals each respectively associated with one of poles N; S; $S_L$. Each pulse signal is bounded by a rising flank ("high") and a falling flank ("low").

The embodiment of FIG. 2 assumes a reversal of direction through a relay change of polarity of the supply voltage of an electric motor driving a rotary drive. This change in polarity occurs at a position of the moving part to be moved by the rotary drive designated with the pulse signal counting value 21. The moving part to be moved may be any of a wide variety of motor-driven parts, but in this embodiment is assumed to be the window of a motor vehicle. The previous and current direction of rotation is controlled by the activation of the relay as well as by the correspondence between the poles of the direct current source and the drive motor of the rotary drive. Following the change in polarity at position 21, the rotary drive at first continues to move in the previous direction of rotation, but at an increasingly slower rotational speed, which is indicated by the initially increasing pulse length of the poles N; $S_L$; N; S. The actual switch in direction of the transmitter wheel 1 takes place while the sensor 2 encounters the third pole N—as indicated by the dashed center line designating reversal point U. Following the reversal point U, the pulse lengths of the poles S; N; $S_L$; N then shorten again. The reversal point U of the mechanical reversal of rotation direction is therefore reached when the pulse lengths of the poles, which were uniform in length prior to the original change in polarity, after increasing monotonically, once again decrease monotonically. The pulse length of the pole with which the direction of rotation actually reverses is not taken into consideration in this embodiment.

By determining the number of pulse signals, e.g. on the basis of the rising and/or falling flanks, between the two encounters of the asymmetric pole $S_L$, the correction value can be determined. In particular, the correction value for ascertaining the correct position can be determined by subtracting (i) the number of the pulse signals detected by the stator-side sensor 2 between the two reference signals $S_L$ rotating sequentially past the sensor 2 in first the one and then the other direction of rotation from (ii) the final value counted by the sensor 2 during the full measuring time. In the concrete example shown in FIG. 2, the number of pulse signals detected between the two reference signals $S_L$ is seven pulse signals, from pulse signal count value 22 to pulse signal count value 29. This number 7 is therefore subtracted from the final signal count value 29, thus yielding the pulse signal count value 22 as the corrected position for the moving part that is being driven by the rotary drive.

According to one further embodiment of the present invention, the measurement is simplified by counting only the rising or the falling flanks of the pulse signals. More specifically, the evaluating device 4 counts, e.g., each rising flank sensed during the time period between the two relevant occurrences of the reference signal defined by the extended pole $S_L$. In this case, the corrected value is provided by doubling the count of the measured rising flanks are then subtracting this doubled count value from the position count value registered at the end of the measuring time.

The above description of the preferred embodiments has been given by way of example. From the disclosure given, those skilled in the art will not only understand the present invention and its attendant advantages, but will also find apparent various changes and modifications to the methods and structures disclosed. It is sought, therefore, to cover all such changes and modifications as fall within the spirit and scope of the invention, as defined by the appended claims and equivalents thereof.

What is claimed is:

1. A toothbrush comprising:
    an elongated handle which comprises a first handle section and a wish bone shaped structure, which provides two arms, and which wish bone shaped structure is attached to said first handle section; and
    a brush head section connected to said elongated handle, wherein said brush head section comprises:
        a main head section having an axle located on each of said arms;

a rotary brush operatively connected to each of said axles, and adapted to be located, in use, on the buccal and lingual side of a tooth to be cleaned; and wherein said axle connects said rotary brush to said main head section;

characterized in that each of said rotary brushes rotate about said axle so that the axis of rotation of each brush is essentially parallel to the long axis of the tooth, and wherein said brush head section additionally comprises a third brush, located perpendicular to, and between said axles, and which third brush is attached to said main head section to brush the top surface of the tooth.

2. A toothbrush as claimed in claim 1 wherein said third brush is split so as to comprise two split brush section, and wherein a split brush section of said third brush is attached to each arm.

3. A toothbrush as claimed in claim 2 wherein said split which establishes said split brush sections provides a gap between said split brush sections of said third brush, so that the distal end of one arm is not connected to the distal end of the other arm.

4. A toothbrush as claimed in claim 2 wherein said gap between said split brush sections is on an angle with respect to said handle so that said split brush sections overlap when said toothbrush is moved along the line of teeth to be cleaned.

5. Method in accordance with claim 1, wherein the pulse signals are at least approximations of rectangular signals, each of which is bounded by a rising flank and a falling flank, producing, respectively, a logic-high value and a logic-low value.

6. Method in accordance with claim 1, wherein the intermittent reference signal is a signal per signal rotation of the rotary drive.

7. Method in accordance with claim 1, wherein the intermittent reference single signal per single rotation of a rotation impulse transmitter having a predefined proportional relationship with the rotary drive.

8. Method in accordance with claim 5, wherein the pulse signal correction value is generated by counting both the rising flanks and the falling flanks of the pulse signals between occurrence of the first reference signal after the signaled switch in the rotational direction, but before the actual reversal of the rotary drive, and occurrence of the immediately subsequent, second reference signal after the actual reversal of the rotary drive;

and method further comprising adjusting the stator pulse signal count value following the reversal of the rotary drive by subtracting the pulse signal correction value from the pulse signal count value corresponding to the second reference signal.

9. Method in accordance with claim 5, wherein the pulse signal correction value is generated by counting only either the rising flanks or the falling flanks of the pulse signals between occurrence of the first reference signal after the signaled switch in the rotational direction, but before the actual reversal of the rotary drive, and occurrence of the immediately subsequent, second reference signal after the actual reversal of the rotary drive;

said method further comprising adjusting the stator-side pulse signal count value following the reversal of the rotary drive by subtracting double the pulse signal correction value from the pulse signal count value corresponding to the second reference signal.

10. Device for determining an actual reversal of a rotary drive that follows on after preceding signaled switch in rotary signaled switch in rotary direction, comprising:

an asymmetrical rotor-side transmitter producing a sequence of pulse signals that are proportional to rotational speed of the drive, and an intermittent reference signal that differs from the pulse signals;

one signal stator-side sensor receiving the signals from the rotor-side transmitter and outputting a stator-side count value; and and evaluating device forming a pulse signal correction value derived from a count of the signals between respective occurrences of the reference signal count value, based on the pulse signal correction value, to reflect the actual reversal of the rotary drive.

11. Device in accordance with claim 10, wherein said transmitter comprises a magnet wheel with magnet poles distributed around a circumference of said magnet wheel; and wherein a signal one of said magnet poles is a reference signal transmitter having a pole width different from respective pole widths of all other magnet poles of said magnet wheel.

12. Device in accordance with claim 11, wherein the pole width of the reference signal transmitter is larger than the pole widths of the other magnetic poles.

* * * * *